US011940965B2

(12) United States Patent
Chen

(10) Patent No.: US 11,940,965 B2
(45) Date of Patent: *Mar. 26, 2024

(54) DATA MIGRATION METHOD AND APPARATUS

(71) Applicant: ALIBABA GROUP HOLDING LIMITED, Grand Cayman (KY)

(72) Inventor: Yizhe Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 34 days.

This patent is subject to a terminal disclaimer.

(21) Appl. No.: 17/659,448

(22) Filed: Apr. 15, 2022

(65) Prior Publication Data

US 2022/0245101 A1    Aug. 4, 2022

Related U.S. Application Data

(63) Continuation of application No. 16/147,376, filed on Sep. 28, 2018, now Pat. No. 11,354,283, which is a
(Continued)

(30) Foreign Application Priority Data

Mar. 31, 2016   (CN) .................... 201610202889.0

(51) Int. Cl.
*G06F 16/21*   (2019.01)
*G06F 16/178*  (2019.01)
*G06F 16/27*   (2019.01)

(52) U.S. Cl.
CPC .......... *G06F 16/214* (2019.01); *G06F 16/178* (2019.01); *G06F 16/27* (2019.01)

(58) Field of Classification Search
CPC ...... G06F 16/214; G06F 16/178; G06F 16/27; G06F 3/0647; G06F 3/067
See application file for complete search history.

(56) References Cited

U.S. PATENT DOCUMENTS

| 7,805,583    | B1 | 9/2010 | Todd     |
|--------------|----|--------|----------|
| 2003/0174731 | A1 | 9/2003 | Tafazolli |

(Continued)

FOREIGN PATENT DOCUMENTS

| CN | 101079902 A | 11/2007 |
|----|-------------|---------|
| CN | 101282345 A | 10/2008 |

(Continued)

OTHER PUBLICATIONS

PCT International Search Report issued in International Application No. PCT/CN2017/077722, dated Jun. 22, 2017 (4 pages).

(Continued)

*Primary Examiner* — Mark D Featherstone
*Assistant Examiner* — Kweku William Halm
(74) *Attorney, Agent, or Firm* — Finnegan, Henderson, Farabow, Garrett & Dunner, LLP

(57) ABSTRACT

Embodiments of the present disclosure provide a data migration method and apparatus. The method includes: receiving a migration task of migrating data in a first system to a second system; and calling upper-layer interfaces corresponding to the migration task, and calling underlying operation interfaces of the first system and the second system by the upper-layer interfaces through an abstract interface class to migrate the data of the first system to the second system. Bidirectional data transmission and migration can be implemented between any two data ends. Bidirectional data transmission and migration between any data terminals.

21 Claims, 8 Drawing Sheets

Related U.S. Application Data continuation of application No. PCT/CN2017/077722, filed on Mar. 22, 2017.

(56) References Cited

U.S. PATENT DOCUMENTS

| | | |
|---|---|---|
| 2004/0098419 A1 | 5/2004 | Bantz |
| 2010/0274825 A1 | 10/2010 | Nemoto |
| 2011/0040943 A1 | 2/2011 | Kondo |
| 2012/0284233 A1 | 11/2012 | Otani |
| 2013/0080488 A1 | 3/2013 | Li et al. |
| 2013/0218901 A1 | 8/2013 | Majnemer et al. |
| 2014/0019212 A1 | 1/2014 | Lieblich |
| 2015/0020059 A1 | 1/2015 | Davis |
| 2015/0096011 A1* | 4/2015 | Watt ............... G06F 3/0647 726/15 |
| 2016/0253339 A1 | 9/2016 | Ambrose |
| 2017/0046373 A1 | 2/2017 | Baker |
| 2017/0177649 A1 | 6/2017 | Badrinarayanan |
| 2019/0042609 A1 | 2/2019 | Senthilnathan |
| 2019/0310973 A1 | 10/2019 | Singh |
| 2020/0403920 A1 | 12/2020 | Thanasekaran |

FOREIGN PATENT DOCUMENTS

| | | |
|---|---|---|
| CN | 103052938 A | 4/2013 |
| CN | 103605728 A | 2/2014 |
| CN | 103856724 A | 6/2014 |
| CN | 104424283 A | 3/2015 |
| WO | WO 2017/167100 A1 | 10/2017 |

OTHER PUBLICATIONS

First Chinese Search Report issued in corresponding Chinese Application No. 201610202889.0 dated Jan. 3, 2020 (2 pages).

Gavish et al., "Dynamic file migration in distributed computer systems," pp. 177-189 (1990).

* cited by examiner

US 11,940,965 B2

DATA MIGRATION METHOD AND APPARATUS

CROSS-REFERENCE TO RELATED APPLICATION

The present application is a continuation of Ser. No. 16/147,376 filed Sep. 28, 2018, which claims the benefit of priority to International Application No. PCT/CN2017/077722, filed on Mar. 22, 2017, which claims priority to Chinese Patent Application No. 201610202889.0, filed on Mar. 31, 2016, all of which are incorporated herein by reference in their entireties.

TECHNICAL FIELD

The present disclosure relates to the field of computer technologies, and in particular, to a data migration method and a data migration apparatus.

BACKGROUND

With the rapid development of cloud computing platforms and markets at home and abroad, there are increasingly more cloud storage products. On a cloud computing platform, a cloud server and a cloud storage are fundamental and important products. Various major cloud service providers have their own cloud storage products, for example, S3 of Amazon Web Services (AWS), Object Storage Service (OSS) of ALIYUN, and a storage data service (Blob) of the Microsoft cloud computing platform Azure. In addition, there are also service providers that specifically provide a cloud storage service, such as QiNiu cloud storage.

There are various types of cloud storage products. They share some common functions and usage, but may have some differences and respective features in terms of Application Programming Interface (API) calling and Software Development Kit (SDK) programming. In actual use, switching from one cloud service provider to another service provider is possible due to migration of a whole service. In this case, data of the cloud storage may also need to be migrated synchronously. Alternatively, in order to ensure data security, data is not only backed up synchronously on multiple cloud storage products provided by the same service provider but also backed up on a cloud storage product provided by a different service provider to reduce risks. Alternatively, data in a client terminal file system is synchronously migrated to a cloud storage product provided by a cloud service provider.

However, some existing data migration technologies or tools may only be used for transmitting data between a cloud storage product provided by a service provider and a user, but may not support other cloud storage products. Some other existing data migration technologies or tools may be used for migrating data from another storage system to a cloud storage product provided by a service provider, but may not implement bidirectional migration of data between any two storage systems.

SUMMARY

In view of the foregoing problem, embodiments of the present disclosure are proposed to provide a data migration method and a corresponding data migration apparatus to attempt to overcome the foregoing problem or at least partially solve the foregoing problem.

According to some embodiments of the present disclosure, there is provided a method of migrating data between a first system and a second system. The method includes receiving a migration task of migrating data from a first system to a second system. The method also includes calling upper-layer interfaces corresponding to the migration task, and calling, by the upper-layer interfaces, underlying operation interfaces of the first system and the second system through an abstract interface class to migrate the data from the first system to the second system.

According to some embodiments of the present disclosure, there is provided an apparatus for migrating data between a first system and a second system. The apparatus includes a task receiving module adapted to receive a migration task of migrating data from a first system to a second system. The apparatus also includes a migration module adapted to call upper-layer interfaces corresponding to the migration task, and call, by using the upper-layer interfaces, underlying operation interfaces of the first system and the second system through an abstract interface class to migrate the data from the first system to the second system.

According to some embodiments of the present disclosure, there is provided a non-transitory computer-readable storage medium storing a set of instructions that is executable by one or more processors of one or more electronic devices to cause the one or more electronic devices to perform a method of migrating data between a first system and a second system. The method includes receiving a migration task of migrating data from the first system to the second system. The method also includes calling upper-layer interfaces corresponding to the migration task, and calling, by the upper-layer interfaces, underlying operation interfaces of the first system and the second system through an abstract interface class to migrate the data from the first system to the second system.

The embodiments of the present disclosure can include the following advantages. First of all, bidirectional data transmission and migration can be implemented between any two data ends. Secondly, the data migration technology of the present disclosure can implement bidirectional data transmission and migration between any data terminal, including cloud storage products that may not have supported data migration yet.

DETAILED DESCRIPTION

To make the foregoing objectives, features and advantages of the present disclosure easier to understand, the present disclosure is described in further detail below with reference to the accompanying drawings and specific implementations.

One of core ideas of the embodiments of the present disclosure is receiving a migration task of migrating data in a first system to a second system. The first system and the second system can include any two systems among multiple systems. Upper-layer interfaces corresponding to the migration task are called, and underlying operation interfaces of the first system and the second system are called by the upper-layer interfaces through an abstract interface class to migrate the data of the first system to the second system.

First of all, bidirectional data transmission and migration can be implemented between any two data ends, including inter-bucket migration inside a data end.

Secondly, the data migration technology of the present disclosure can have a good extension function, and can implement bidirectional data transmission and migration between any data terminal, including cloud storage products that may not have supported data migration yet such as Baidu Object Storage and Kingsoft Standard Storage Service, and any other data end.

Figure 1A:
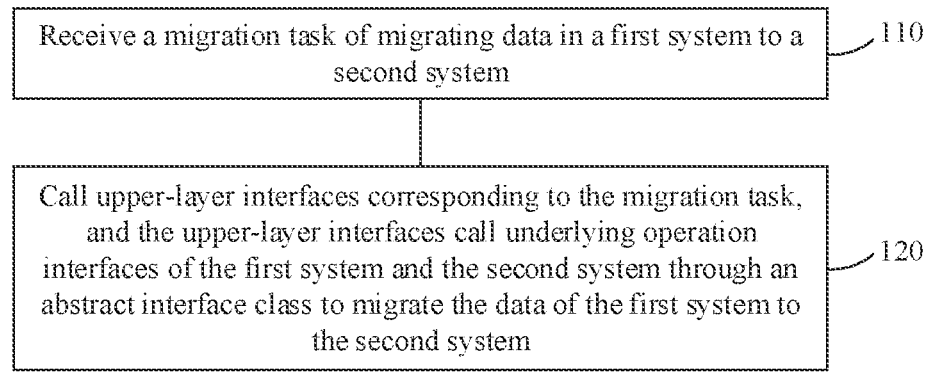
FIG. 1A is a flowchart of an exemplary data migration method according to some embodiments of the present disclosure.

Referring to FIG. 1A, FIG. 1A is a flowchart of an exemplary data migration method according to some embodiments of the present disclosure. The method can include steps 110 and 120.

In step 110, a migration task of migrating data in a first system to a second system is received. The first system and the second system can include any two systems among multiple systems.

Figure 1B:
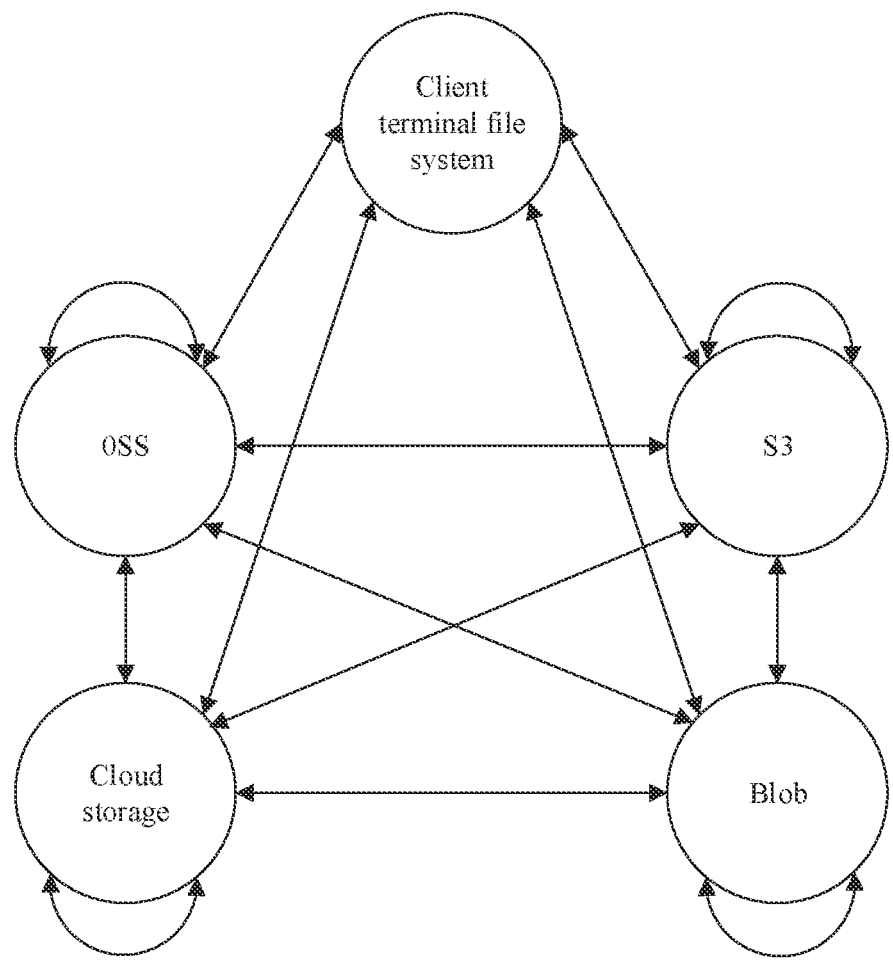
FIG. 1B is a schematic diagram of exemplary data migration performed by five systems according to some embodiments of the present disclosure.

A data migration method of the present disclosure can include a method for migrating data in one system to another system, and can be directed to any two systems among multiple systems. The system can include a server having a storage function, or a storage space, a cloud storage product, and the like, for example, a client terminal file system (Local), S3 of Amazon Web Services (AWS), Object Storage Service (OSS) of ALIYUN, a storage data service (Blob) of the Microsoft cloud computing platform Azure, QiNiu cloud storage (QiNiu), and the like. FIG. 1B is a schematic diagram of exemplary data migration performed by the five systems above. It can be seen that any two systems among the multiple systems can perform bidirectional data transmission and migration, including data migration between different buckets inside a system. A bucket can include a storage space used by a user to manage stored objects, which is similar to a root directory or a disk partition in a file system. Moreover, the data migration method of the present disclosure can have a good extension function. Other cloud storage products that may not have been added to the five systems shown in FIG. 1B, such as Baidu Object Storage (BOS), Kingsoft Standard Storage Service (KS3) and the like, can also be added to perform bidirectional data transmission and migration with any other system.

In order to distinguish two systems, it can be defined that data in the first system is migrated to the second system. The first system and the second system can include two systems of the same type. For example, both the systems are an OSS of ALIYUN. In this case, data of one OSS is migrated to another OSS. For example, data in an OSS of one region is migrated to an OSS of another region. The first system and the second system can also be two systems of different types, for example, an OSS and a Blob, respectively. In this case, data in the OSS is migrated to the Blob. Alternatively, the first system and the second system can also be two different storage areas in the same system. In this case, data in one bucket is migrated to another bucket in the same system.

In terms of the specific first system, second system, and migrated data, for example, it can be set in a migration task whether all data or a part of data in the first system is migrated to the second system. A server receiving the data migration task can acquire the foregoing information from the migration task.

In some embodiments of the present disclosure, the migration task is sent by a client terminal. The migration task includes identifier information of the first system, identity information of a user in the first system, file information of to-be-migrated data in the first system, identifier information of the second system, and identity information of the user in the second system. The identifier information of the first system can include information that can uniquely identify the first system, such as an access domain name of the first system. The identity information of the user in the first system can include identity information of a current user of the first system, such as a user name. The identifier information of the second system can include information that can uniquely identify the second system, such as an IP address of the second system. The identity information of the user in the second system can include identity information of a current user of the second system, such as a user name. The file information of to-be-migrated data in the first system can include a file name, a storage location, data size, and other information of the to-be-migrated data in the first system.

In an actual application, these embodiments of the present disclosure can provide a migration configuration page in a client terminal. A user can configure related information in the migration configuration page, including the identifier information of the first system that serves as a migrated object, the identity information of the user in the first system, the file information of the to-be-migrated data in the first system, the identifier information of the second system that serves as a migration target object, and the identity information of the user in the second system. The related information can also include a migration object identifier. If the user is to migrate all data of the first system, the migration object identifier can be configured as "all" where "all" indicates migrating all the data of the first system. If the user is to migrate one or some particular files, a storage path of the file or files in a first storage system can be configured as the migration object identifier. Other requirement information can further be configured. For example, some storage systems are distributed in different regions, e.g., there are one storage center in Beijing and one storage center in Shanghai. In this case, a region where the storage system is located can further be configured. Specific configuration items can be set as required.

In step 120, upper-layer interfaces corresponding to the migration task are called, and the upper-layer interfaces call underlying operation interfaces of the first system and the second system through an abstract interface class to migrate the data of the first system to the second system.

In these embodiments of the present disclosure, multiple servers can be connected to form a large processing cluster. The whole cluster has one control node (master) server and multiple working node (slave) servers. The master is configured to receive a migration task of migrating data in the first system to the second system, and then dispatch, according to a reasonable dispatching policy, the received migration task to the slaves for processing. After finishing processing the received migration task, the slaves can feed back migration results to the master. These embodiments of the present disclosure can also implement data migration by using a single server. For example, the present disclosure employs the foregoing cluster manner.

Figure 1C:
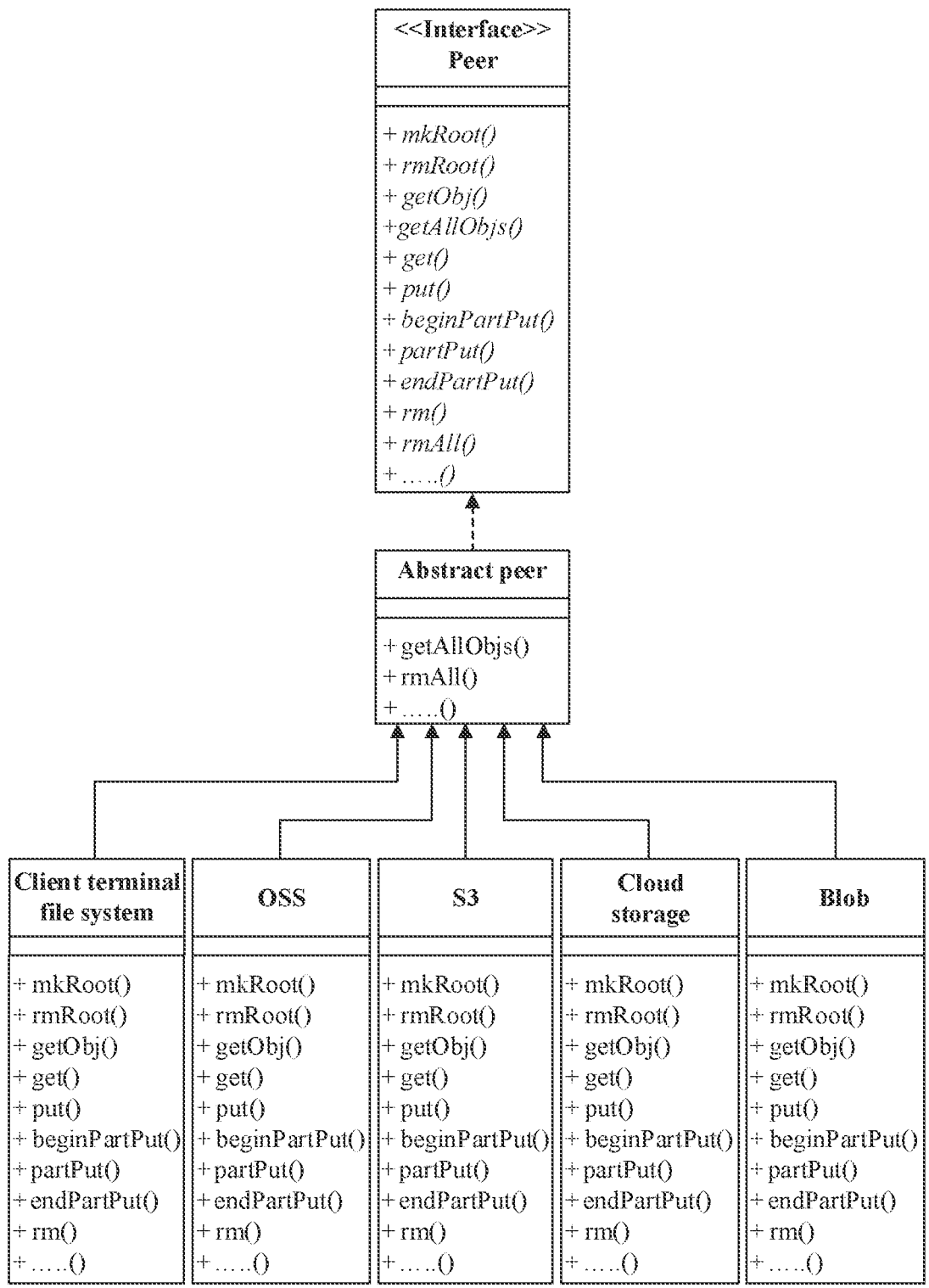
FIG. 1C is a schematic diagram of exemplary interface calling in a data migration process of five systems according to some embodiments of the present disclosure.

FIG. 1C is a schematic diagram of exemplary interface calling in a data migration process of the foregoing five systems according to some embodiments of the present disclosure. The upper-layer (Peer) interfaces may define functions of each specific system that performs data migration. For example, get( ) and put( ) can refer to downloading data and uploading data respectively, and these can include interfaces that are to be called for transmitting actual data.

mkRoot( ) and rmRoot( ) can be used for establishing and deleting a root directory. An object of the operation is a bucket in a system. A bucket storage space can include a storage space used by a user to manage stored objects, and can be similar to a root directory or disk partition in a file system.

getObj( ) and getAllObjs( ) can be used for acquiring a single piece of metadata and acquiring all metadata. Metadata of data to be transmitted is acquired by using these interfaces mainly. Metadata serves as descriptive data of actually stored data, and may only include information such as a key, a data size, a timestamp, and the like that identify the uniqueness of the data.

beginPartPut( ), partPut( ), and endPartPut( ) can be mainly used for processing a breakpoint resume function and a function of transmitting slices of a large file.

rm( ) and rmAll( ) can be used for deleting a single piece of data and deleting all data.

Some upper-layer interfaces, such as getAllObjs( ) and rmAll( ) can be implemented by calling other underlying operation interfaces such as getObj( ) and rm( ). This may be universal for any system for performing data migration, and can be implemented in an abstract interface class (AbstractPeer) layer shown in FIG. 1C.

Therefore, in these embodiments of the present disclosure, calling of the underlying operation interfaces can be implemented at the AbstractPeer layer, for example, underlying operation interfaces formed by the Local, OSS, S3, QiNiu and Blob in FIG. 1C. Therefore, upper-layer interfaces corresponding to the migration task can be called. The upper-layer interfaces call the underlying operation interfaces of the first system and the second system through the abstract interface class to migrate the data of the first system to the second system.

For example, if a migration task is to migrate data in the Local to the OSS, upper-layer interfaces corresponding to the migration task can be called, including an upper-layer interface for acquiring data in the Local and an upper-layer interface for synchronizing the acquired data to the OSS. Then, the upper-layer interface for acquiring data in the Local can first call the getObj( ) interface and the get( ) interface sequentially through a corresponding abstract interface class to acquire migration data in the Local. Next, the upper-layer interface for synchronizing the acquired data to the OSS can call the put( ) interface in the OSS sequentially through a corresponding abstract interface class to transmit the migration data acquired from the Local to the OSS.

A uniform upper-layer interface layer peer is set in some examples, and various operation interfaces can be constructed in the peer. An abstract interface class layer AbstractPeer can be further constructed, and the abstract interface class layer can inherit the upper-layer interface layer. Then, underlying operation interfaces of the storage systems (such as the foregoing Local, OSS, S3, QiNiu, and Blob) can inherit the AbstractPeer, so that a mutual data migration process can be implemented between different systems. Meanwhile, due to the presence of the abstract interface class layer AbstractPeer, for a new storage system, a data migration process can be implemented between the new storage system and any previous storage system as long as an underlying operation interface layer of the new storage system inherits the abstract interface class layer AbstractPeer.

In some embodiments of the present disclosure, step 120 may include the following sub-steps.

In sub-step 121, upper-layer interfaces belonging to data acquisition and upper-layer interfaces belonging to data synchronization are determined.

In these embodiments of the present disclosure, upper-layer interfaces for acquiring data from the first system are defined as upper-layer interfaces belonging to data acquisition, and upper-layer interfaces for synchronizing the acquired data to the second system are defined as upper-layer interface belonging to data synchronization. In an actual application, the upper-layer interface belonging to data acquisition and the upper-layer interface belonging to data synchronization can each include one or more upper-layer interfaces.

In an actual application, after a migration task is received, it is to determine each upper-layer interface that is to be called to acquire data from a storage system and an uploading interface that is to be called to store the data to another system.

For example, the migration task includes the identifier information of the file system from which the data is to be migrated and file information of a file to be migrated. If breakpoint resume is not needed, the upper-layer interface getObj( ) in the peer in FIG. 1C is to be called to acquire metadata, and the upper-layer interface get( ) in the peer in FIG. 1C also is to be called to acquire actual data. In this case, getObj( ) and get( ) are upper-layer interfaces belonging to data acquisition. In an actual application, the upper-layer interfaces belonging to data acquisition can further include an upper-layer interface for performing identity verification on the identity information of the user in the first system, for example, an account name and a password of the user in the first system.

For the second system, as the file is migrated from the first system, the second system generally does not have a corresponding folder. Thus, mkRoot( ) in the peer in FIG. 1C is to be called to establish a directory, and put( ) in the peer in FIG. 1C is to be called to upload data. In this case, mkRoot( ) and put( ) are upper-layer interfaces belonging to data synchronization. In an actual application, the upper-layer interfaces belonging to data synchronization can also include an upper-layer interface for performing identity verification on the identity information of the user in the second system, for example, an account name and a password of the user in the second system.

In sub-step 122, for the upper-layer interfaces belonging to data acquisition, underlying operation interfaces of the first system are called through the abstract interface class to acquire data from the first system.

As described above, in an actual application, the upper-layer interfaces call the underlying operation interfaces of the first system through the abstract interface class to migrate the data of the first system to the second system. The process of migrating the data of the first system to the second system includes acquiring the data from the first system. In addition, the underlying operation interfaces of the first system can be called through the abstract interface class by using the upper-layer interfaces belonging to data acquisition so as to acquire data from the first system.

In an actual application, the server in these embodiments of the present disclosure can transmit the identifier information of the first system as a parameter to an upper-layer interface for data acquisition. Thus, the upper-layer interface then calls an abstract interface class, and the abstract interface class can call a corresponding underlying operation interface of the first system according to the identifier information.

In some embodiments of the present disclosure, sub-step 122 may include the following sub-steps.

In sub-step 1221, for a first upper-layer interface in the upper-layer interfaces belonging to data acquisition, a first abstract class interface in the abstract interface class and corresponding to the first upper-layer interface is directly called as an underlying operation interface. The first upper-layer interface can include a universal interface for different systems.

In an actual application, universal interfaces for different systems, such as getAllObjs( ) and rmAll( ), among the upper-layer interfaces belonging to data acquisition can be referred to as first upper-layer interfaces, which can be implemented by calling other underlying operation interfaces. Therefore, for a first upper-layer interface in the upper-layer interfaces belonging to data acquisition, a first abstract class interface in the abstract interface class and corresponding to the first upper-layer interface can be directly called as an underlying operation interface.

For example, for the first upper-layer interface getAllObjs( ) a first abstract class interface getAllObjs( ) in the abstract interface class is implemented by calling an underlying operation interface getObj( ). Therefore, the first abstract class interface getAllObjs( ) can be directly called as an underlying operation interface in this case, which can be equivalent to calling an underlying operation interface getObj( ).

The server in these embodiments of the present disclosure can transmit the identifier information of the first system as a parameter to an upper-layer interface for data acquisition. Thus, the upper-layer interface then calls an abstract interface class. If the abstract interface class includes a first abstract class interface corresponding to the upper-layer interface, the first abstract class interface can be executed according to parameters such as the identifier information.

In sub-step 1222, for second upper-layer interfaces in the upper-layer interfaces belonging to data acquisition, a first interface class for the first system is generated based on the abstract interface class, and underlying operation interfaces corresponding to the second upper-layer interfaces are called in the first interface class. The second upper-layer interfaces may include one or more interfaces not universal for different systems.

Universal upper-layer interfaces for different systems can be referred to as second upper-layer interfaces. For this type of upper-layer interfaces, a first interface class for the first system is to be generated through the abstract interface class. Then, underlying operation interfaces corresponding to the second upper-layer interfaces are called in the first interface class.

The server in these embodiments of the present disclosure can transmit the identifier information of the first system as a parameter to an upper-layer interface for data acquisition. Thus, the upper-layer interface then calls an abstract interface class. If the abstract interface class has no first abstract class interface corresponding to the upper-layer interface, the first abstract class interface generates a first interface class corresponding to the first system according to the identifier information, and then calls, in the first interface class, an underlying interface corresponding to the upper-layer interface.

In sub-step 123, for the upper-layer interfaces belonging to data synchronization, underlying operation interfaces of the second system are called through the abstract interface class to synchronize the data acquired from the first system to the second system.

As described above, in an actual application, the upper-layer interfaces call the underlying operation interfaces of the first system through the abstract interface class to migrate the data of the first system to the second system. The process of migrating the data of the first system to the second system includes synchronizing the data acquired from the first system to the second system. In this case, the underlying operation interfaces of the second system can be called through the abstract interface class by using the upper-layer interfaces belonging to data synchronization to synchronize the data acquired from the first system to the second system.

In an actual application, the server in these embodiments of the present disclosure can transmit the identifier information of the second system as a parameter to an upper-layer interface for data acquisition. Thus, the upper-layer interface then calls an abstract interface class. If the abstract interface class has no first abstract class interface corresponding to the upper-layer interface, the abstract interface class can call a corresponding underlying operation interface of the second system according to the identifier information.

In these embodiments of the present disclosure, for step 122, after the underlying operation interface for data acquisition of the first system acquires real data that is to be migrated to the second system, these embodiments of the present disclosure can directly transmit the real data to a storage interface for data synchronization of the second system. Thus, migration between buckets inside two storage systems can be implemented. For example, after data is acquired by calling get( ) of the first system, the data is directly transmitted to put( ) of the second system. Both processing procedures are performed in a memory. In this case, the data is directly migrated to the second system but is not stored in a local magnetic disk. In an actual application, these embodiments of the present disclosure can set a first function to monitor whether get( ) acquires data. If it is determined that get( ) acquires data, the data is transmitted to put( ). In these embodiments of the present disclosure, after an underlying interface that acquires data transmits the data to an underlying operation interface for data synchronization, a transmission channel is constructed between the underlying interface that acquires the data and the underlying operation interface for data synchronization, and is used for transmitting data between two types of interfaces. After each piece of data is transmitted, the data is neither stored locally nor accumulated in the memory.

In some embodiments of the present disclosure, sub-step 123 may include the following sub-steps.

In sub-step 1231, for a third upper-layer interface in the upper-layer interfaces belonging to data synchronization, a second abstract class interface in the abstract interface class and corresponding to the third upper-layer interface is directly called as an underlying operation interface. The third upper-layer interface can include a universal interface for different systems.

In this case, an upper-layer interface universal for different systems in the upper-layer interfaces belonging to data synchronization can be referred to as a third upper-layer interface. A second abstract class interface in the abstract interface class and corresponding to the third upper-layer interface is directly called as an underlying operation interface. The server in these embodiments of the present disclosure can transmit the identifier information of the second system as a parameter to an upper-layer interface for data acquisition. Thus, the upper-layer interface then calls an abstract interface class. If the abstract interface class has a second abstract class interface corresponding to the upper-layer interface, the second abstract class interface can be executed according to the identifier information and other parameters. This sub-step can be similar to sub-step 1221 above, and is not described in detail here again.

In sub-step 1232, for fourth upper-layer interfaces in the upper-layer interfaces belonging to data synchronization, a second interface class is generated for the second system through the abstract interface class, and underlying operation interfaces corresponding to the fourth upper-layer interfaces are called in the second interface class. The fourth upper-layer interfaces may include one or more interfaces not universal interfaces for different systems.

In this case, upper-layer interfaces not universal for different systems in the upper-layer interfaces belonging to data synchronization can be referred to as fourth upper-layer interfaces. A second interface class for the second system is generated through the abstract interface class. Underlying operation interfaces corresponding to the fourth upper-layer interfaces are called in the second interface class. In an actual application, the server in these embodiments of the present disclosure can transmit the identifier information of the second system as a parameter to an upper-layer interface for data acquisition. If the abstract interface class has no second abstract class interface corresponding to the upper-layer interface, the upper-layer interface then calls the abstract interface class. The abstract interface class can call a corresponding underlying operation interface of the second system according to the identifier information. This sub-step can be similar to sub-step 1222 above, and is not described in detail here again.

In some embodiments of the present disclosure, after step 120, the method may further include step S130.

In step 130, it is determined whether the data in the first system is successfully migrated to the second system. If the migration fails, step 120 is performed again or repeatedly, until the number of retries reaches a retry threshold or the migration succeeds in the retry threshold.

In an actual application, interference or errors may occur in the data migration process, causing the data migration to fail. Therefore, in these embodiments of the present disclosure, it is determined whether the data in the first system is successfully migrated to the second system. A successful migration may mean that all data that is to be migrated in a migration instruction is migrated to the second system. Specifically, it can be compared whether migrated data is consistent with data that is set in a migration instruction by determining whether the size of the migrated data is equal to the size of the data that is set in the migration instruction. Other existing available technologies can also be used to perform the comparison.

Whether the data in the first system is successfully migrated to the second system can be determined in many manners. For example, a notification of whether downloading of the first system succeeds and a notification of whether unloading of the second system succeeds are monitored. If a notification indicating unsuccessful downloading or a notification indicating unsuccessful uploading is received, it is confirmed that the migration fails. Other manners for the determination can also be used.

Moreover, in these embodiments of the present disclosure, a retry threshold can be set. If the number of retries exceeds the retry threshold and the migration is still unsuccessful, the current migration task can be given up, and causes of the unsuccessful migration can be examined. The retry threshold can be set as required.

In some embodiments of the present disclosure, after step 120, the method can further include steps 140 to 160.

In step 140, it is determined whether a pause instruction is received, and if the pause instruction is received, step 150 is performed, as explained below.

In the data migration process, if the data migration is to be paused due to some reasons, in this case, a pause instruction can be sent to the server that executes the migration instruction. Therefore, it can be determined whether a pause instruction is received.

In step 150, the migration of the data in the first system to the second system is paused, and a data location where the migration has proceeded in the first system at a pause moment is recorded.

If the pause instruction is received, data migration from the first system to the second system can be paused. Meanwhile, when the data migration from the first system to the second system is started again, in order to prevent data that has been migrated from the first system to the second system from being migrated to the second system again from the beginning, a data location where the migration has proceeded in the first system at a pause moment can be recorded while the data migration from the first system to the second system is paused. As such, data migration can be resumed from the data location where the migration has proceeded, avoiding wasting time.

In an actual application, in these embodiments of the present disclosure, an upper-layer interface for pause can also be called. Then, an underlying operation interface for pause of the first system and an underlying operation interface for pause of the second system are called through the abstract interface class respectively to implement the migration pause process.

In step 160, it is determined whether a restart instruction is received, and if the restart instruction is received, step 120 is performed again from the data location where the migration has proceeded in the first system at the pause moment.

After a pause instruction is received, it can be further determined whether a restart instruction is received. If the restart instruction is received, the step of calling upper-layer interfaces corresponding to the migration task, and calling, by the upper-layer interfaces, underlying operation interfaces of the first system and the second system through an abstract interface class to migrate the data of the first system to the second system is performed again from the data location where the migration has proceeded in the first system at the pause moment. In this case, the data of the first system refers to data that has not been migrated from the first system to the second system.

In an actual application, in these embodiments of the present disclosure, an upper-layer interface for restarting can also be called. Then, an underlying operation interface for restarting of the first system and an underlying operation interface for restarting of the second system are called through the abstract interface class respectively to implement a pause of the migration.

In some embodiments of the present disclosure, when the first system is a client terminal file system, before step 110, the method can further include step 100.

In step 100, an application program is installed in a client terminal. The application program simulates underlying operation interfaces for a specified file.

If the first system is a client terminal file system, migration of data in the client terminal file system to the second system in this case can be considered as backing up the data in the client terminal file system to the second system. For the client terminal, the present disclosure implements interconnection between the client terminal and various systems. In order to adapt to the logic architecture in FIG. 1C, the present disclosure can provide a service for a customer by installing an application program in a client terminal. Therefore, in these embodiments of the present disclosure, if the first system is a client terminal file system, an application program is installed in a client terminal first. The application program simulates underlying operation interfaces for a specified file, for example, the underlying operation interfaces under local in FIG. 1C. Thus, a user of the client terminal can access the application program to call underlying operation interfaces that can edit a specified file corresponding to the application program.

In some embodiments of the present disclosure, after step 120, the method can further include steps 170 and 180.

In step 170, it is monitored whether the client terminal file system is changed with respect to data migrated to the second system most recently. If it is determined that a change occurs, step 180 is performed, as explained below.

In an actual application, multiple users may log onto the application program of the client terminal multiple times, and can modify data in the client terminal file system during the logon process. If data in the client terminal file system is changed, the change part is to be updated into the second system correspondingly. Therefore, for the client terminal file system, it can be monitored whether the client terminal file system is changed with respect to data migrated to the second system most recently. If it is determined that a change occurs, the change is to be updated into the second system. Specifically, the upper-layer interfaces corresponding to the migration task can be called, and the upper-layer interfaces call the underlying operation interfaces of the first system and the second system through the abstract interface class to synchronize change data of the client terminal file system to the second system.

In step 180, the upper-layer interfaces corresponding to the migration task are called, and the underlying operation interfaces of the first system and the second system are called by the upper-layer interfaces through the abstract interface class to synchronize change data of the client terminal file system to the second system.

In some embodiments of the present disclosure, after sub-step 122, the method can further include sub-step 124.

In sub-step 124, an upper-layer interface for signature is called, and the upper-layer interface for signature calls an underlying operation interface for signature of the first system to sign the data.

In these embodiments of the present disclosure, in order to ensure consistency of data before and after the migration, i.e., ensure that migration data in the first system is completely migrated to the second system after one data migration task is completed, data that is to be migrated in the first system can be signed first to identify the data that is to be migrated to the second system. Specifically, an upper-layer interface for signature can be called, and the upper-layer interface for signature calls an underlying operation interface for signature of the first system to sign the data. The data can be signed in the first system, or can be signed when the data is moved out of the first system but is not yet synchronized to the second system.

Further, after sub-step 123, the method can further include sub-step 125.

In sub-step 125, an upper-layer interface for signature authentication is called, and the upper-layer interface for signature authentication calls an underlying operation interface for signature authentication of the second system to perform signature verification on the data.

Theoretically, if the data that is to be migrated to the second system is signed, signature verification can be performed on the migrated data after the data is migrated to the second system. If the signature verification succeeds, it indicates that the data migrated to the second system is consistent with the data that is to be migrated from the first system to the second system. If the signature verification fails, for example, if partial data that has been migrated to the second system does not correspond to the signature of the data in the first system, it indicates that the migration fails, and step 120 can be performed again or repeatedly until the number of retries reaches the retry threshold or the migration succeeds in the retry threshold.

Specifically, an upper-layer interface for signature authentication can be called, and the upper-layer interface for signature authentication calls an underlying operation interface for signature authentication of the second system to perform signature verification on the data.

In some embodiments of the present disclosure, after step 120, the method can further include steps 190, 1110, and 1120.

In step 190, an upper-layer interface of a file list is called for the first system, and the upper-layer interface for calling a file list calls an underlying operation interface of the first system through the abstract interface class to acquire a file list of the first system.

In step 1110, an upper-layer interface of a file list is called for the second system, and the upper-layer interface for calling a file list calls an underlying operation interface of the second system through the abstract interface class to acquire a file list of the second system.

In step 1120, the file list of the first system and the file list of the second system are compared, and a difference between the two file lists is prompted to a client terminal.

In some embodiments of the present disclosure, after sub-step 121, the method can further include sub-steps 126 and 127.

In sub-step 126, an upper-layer interface for identity verification is called for the first system, and the upper-layer interface for identity verification calls an underlying operation interface of the first system through the abstract interface class to verify the identity information of the user in the first system.

In sub-step 127, an upper-layer interface for identity verification is called for the second system, and the upper-layer interface for identity verification calls an underlying operation interface of the second system through the abstract interface class to verify the identity information of the user in the second system.

In these embodiments of the present disclosure, a migration task of migrating data in a first system to a second system can be received. The first system and the second system can include any two systems among multiple systems. Then, upper-layer interfaces corresponding to the migration task are called, and the upper-layer interfaces call underlying operation interfaces of the first system and the second system through an abstract interface class to migrate the data of the first system to the second system.

Bidirectional data transmission and migration can be implemented between any two data ends. Secondly, the data migration technology of the present disclosure can have a good extension function, and can implement bidirectional data transmission and migration between any data terminal, including cloud storage products that may not have supported data migration yet, such as Baidu Object Storage and Kingsoft Standard Storage Service, and any other data end.

Figure 2A:
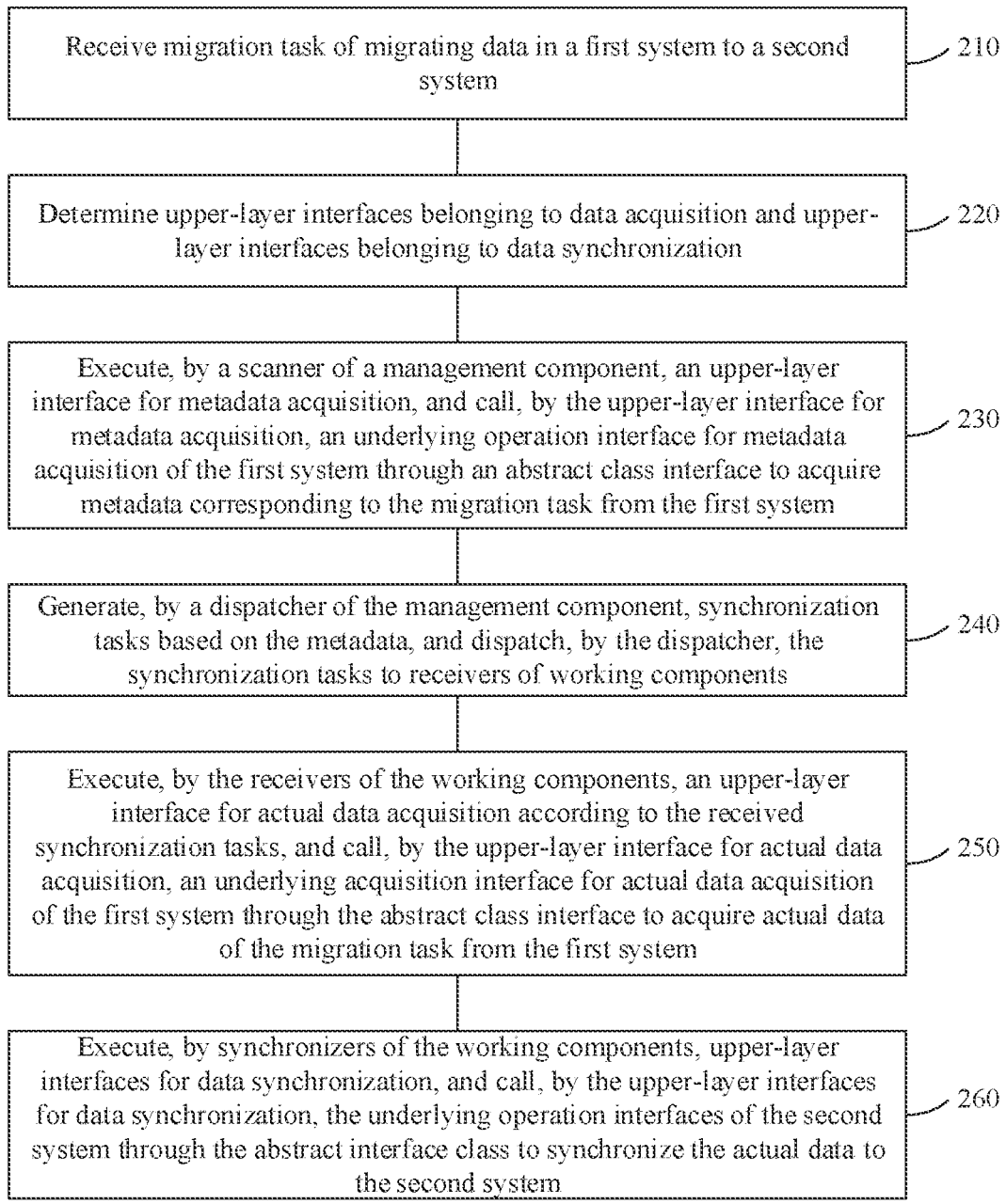
FIG. 2A is a flowchart of an exemplary data migration method according to some embodiments of the present disclosure.

Referring to FIG. 2A, FIG. 2A is a flowchart of an exemplary data migration method according to some embodiments of the present disclosure. Specifically, the method can include steps 210 to 260, as well as any sub-step they may include.

In step 210, a migration task of migrating data in a first system to a second system is received. The first system and the second system can include any two systems among multiple systems. As shown in the example in FIG. 1B, a user can select any two systems, and use one system as the first system and the other system as the second system.

In step 220, upper-layer interfaces belonging to data acquisition and upper-layer interfaces belonging to data synchronization are determined.

In step 230, a scanner of a management component executes an upper-layer interface for metadata acquisition, and the upper-layer interface for metadata acquisition calls an underlying operation interface for metadata acquisition of the first system through an abstract class interface to acquire metadata corresponding to the migration task from the first system.

Figure 2B:
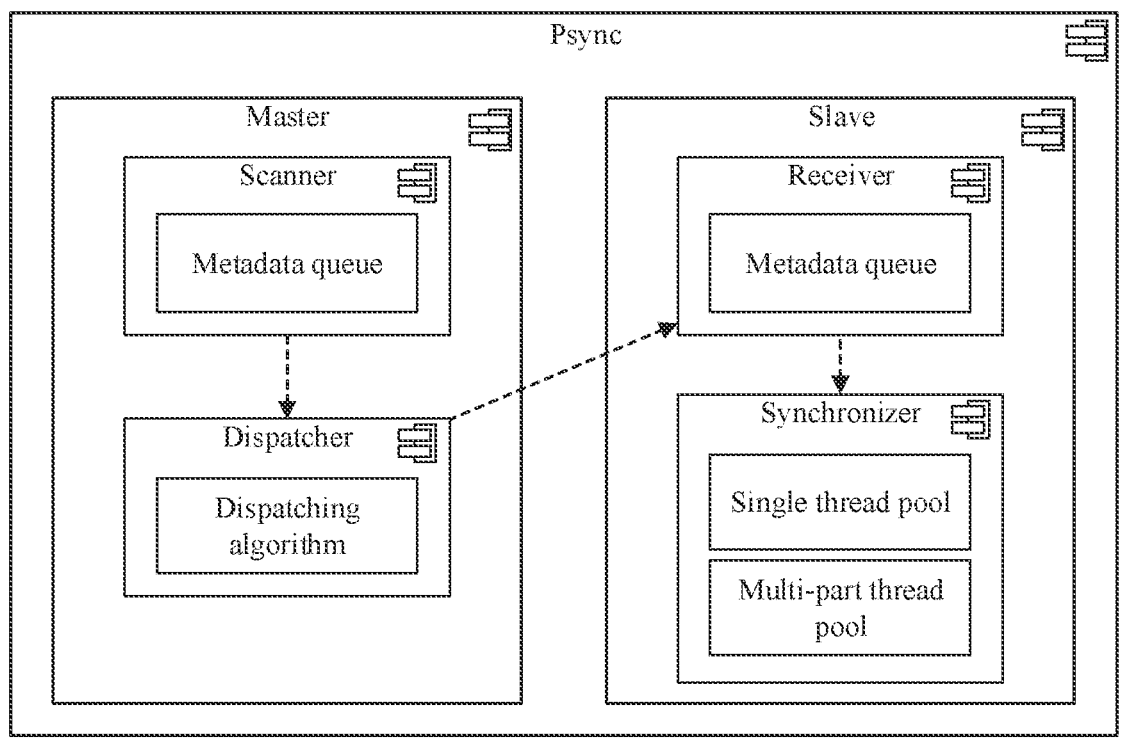
FIG. 2B is a schematic structural diagram of exemplary data migration according to some embodiments of the present disclosure.

FIG. 2B is a schematic structural diagram of exemplary data migration according to some embodiments of the present disclosure. The structure in FIG. 2B includes two major independent components: a master and a slave. The master is mainly responsible for scanning a data source and dispatching a task. The slave is responsible for receiving a task and executing a real data migration operation. The master includes a scanner and a dispatcher. The slave includes a receiver and a synchronizer (syncer). In these embodiments of the present disclosure, the master including the scanner and the dispatcher can be referred to as a management component. The slave including the receiver and the synchronizer can be referred to as a working component. This structure can run in a stand-alone environment and also supports distributed data transmission. In a stand-alone mode, the master and the slave serve as two components in one process and provide services simultaneously. In a distributed mode, a master and a slave coexist in one server in a whole cluster, and only slaves exist in other severs. Alternatively, only a master exists in one server in the cluster and only slaves exist in other servers. The master itself does not occupy too much memory space. Therefore, the master and the slave can coexist in one server to save server costs in the cluster. Some embodiments of the present disclosure can employ the cluster manner, that is, one server includes a master-and-slave configuration while other servers have slaves.

The scanner is responsible for traversing and acquiring metadata of a data source, and putting the metadata into a metadata queue. The metadata, as descriptive data of actually stored data, may only include information such as a key identifying the uniqueness of data, a value of a data volume, a timestamp, and the like. In addition, in some embodiments of the present disclosure, the metadata queue can include a blocking queue. The blocking queue differs from a common queue in that: when the queue is empty, an operation of acquiring data from the queue is to be blocked, or when the queue is full, an operation of adding data to the queue is to be blocked. Similarly, a thread attempting to add new data to the full blocking queue is also be blocked, until other threads make the queue idle again. For example, one or more pieces of data are removed from the queue or the queue is completely cleared. In the data migration process, at first, the metadata is put into the blocking queue sequentially, until the blocking queue is full. Then, the metadata in the blocking queue is moved out sequentially and synchronized to the second system. For each piece of metadata moved out, one piece of metadata can be correspondingly extracted from the first system and stored into the blocking queue, thus effectively balancing a data migration speed.

In these embodiments of the present disclosure, the scanner of the management component can execute an upper-layer interface for metadata acquisition. Thus, the upper-layer interface for metadata acquisition can call an underlying operation interface for metadata acquisition of the first system through the abstract class interface to acquire metadata corresponding to the current migration task from the first system.

The dispatcher is responsible for taking out metadata from the metadata queue of the scanner, and distributing the metadata as a task to a receiver of a slave component according to a dispatching algorithm. Each dispatched task will be recorded. After completing one task, the slave can report to the master for summary. The master can know the current number of tasks of all slave nodes in the whole cluster and a current server load situation in real time.

In the stand-alone mode, the task can be directly dispatched to the slave of the local server. A dispatching algorithm of the dispatcher in the distributed mode can be implemented as follows.

If the data is less than 1 MB, the data is directly dispatched to the slave of the local server, because for small data, executing the data in the local server takes less time than dispatching the data through the network to other servers for execution.

The receiver of the server is responsible for receiving a task dispatched from the dispatcher and storing the task in the metadata queue of the receiver, so that the task waits to be processed.

The synchronizer is a real component that executes data transmission. It constantly acquires metadata of to-be-transmitted data from the metadata queue of the receiver, and puts the metadata into different work thread pools to execute the transmission task.

The work pool thread is a multi-thread processing form. In the processing procedure, tasks are added into a queue, and then the tasks are automatically started after a thread is created. All thread pool threads are background threads. Advantages of using a work pool thread can include reducing the time and system resources spent on creating and destroying threads. If the thread pool is not used, the system may create a large number of threads and thus consume more system memory, and "excessive switching" between different threads may be needed.

In these embodiments of the present disclosure, two work thread pools can be provided. One of the two work thread pools is responsible for processing small data, and can complete transmission of a file corresponding to the whole metadata in one time. The other of the two work thread pools is responsible for processing large data, for example, receiving slice data of a large file corresponding to large metadata.

For a large file, splicing and recovery of the whole large file can be completed in the second system only after transmission of all the slices is finished. A threshold can be preset. If the metadata is less than the threshold, the work thread pool responsible for processing small data processes the metadata. If the metadata is not less than the threshold, the work thread pool responsible for processing large data processes the metadata. There can be only one work thread pool, which uniformly processes all data. For example, the large file may not be sliced.

Figure 2C:
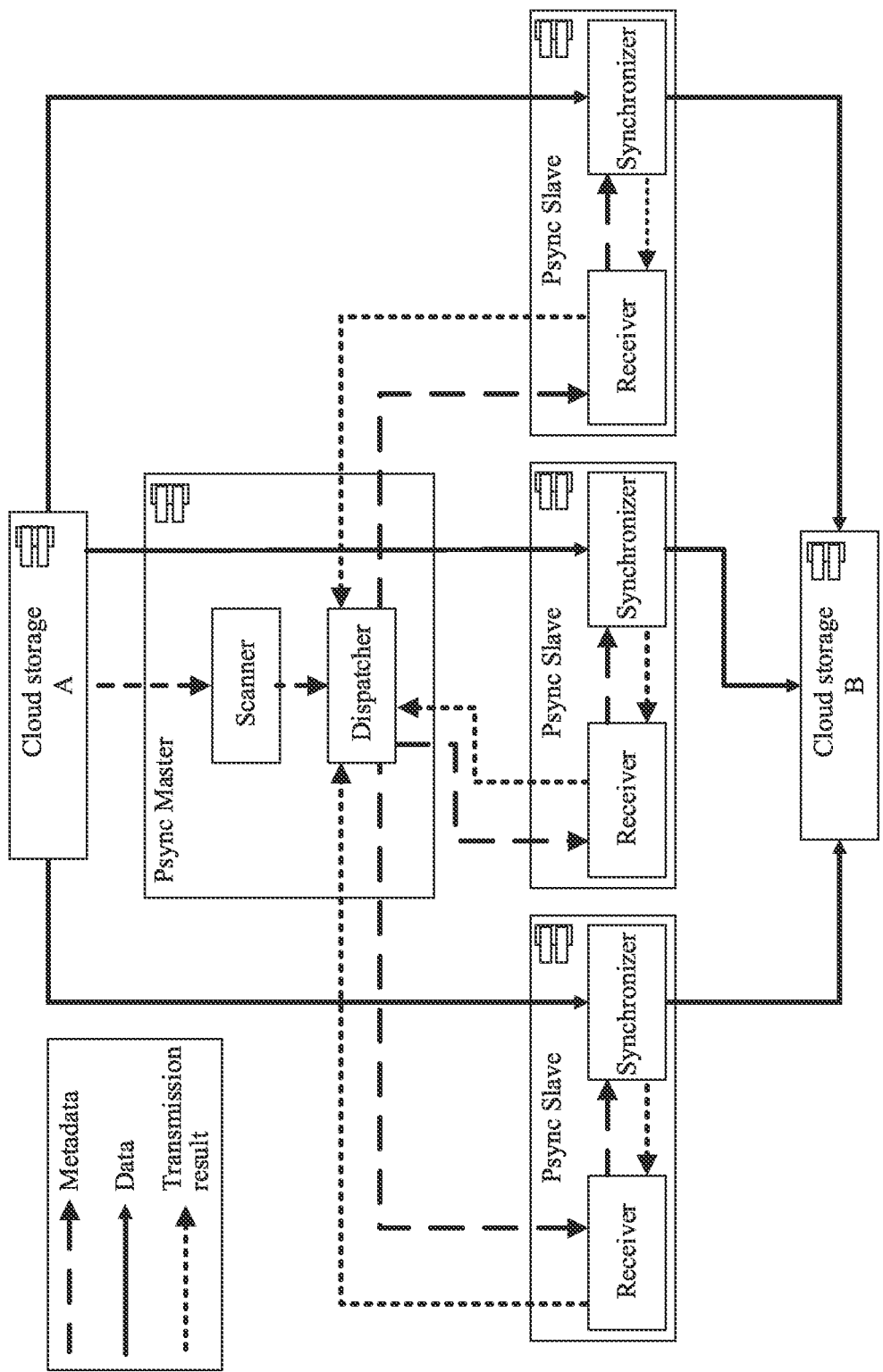
FIG. 2C is a schematic diagram of an exemplary data flow of data migration in a distributed mode according to some embodiments of the present disclosure.

FIG. 2C is a schematic diagram of an exemplary data flow of data migration in a distributed mode according to some embodiments of the present disclosure. Migration of data from cloud storage A to cloud storage B can mainly include the following four steps (1) to (4).

In step (1), a scanner scans a data source "cloud storage A" to acquire metadata.

In step (2), a dispatcher acquires the metadata from the scanner and dispatches the metadata to receivers of slaves according to a dispatching algorithm.

In step (3), syncers acquire the metadata from the receivers and start real data transmission. Actual data is directly downloaded from the data source "cloud storage A," and is directly uploaded to a destination data end "cloud storage B" without being saved in any intermediate file, implementing end-to-end direct transmission.

In step (4) The syncers return each transmission result to the receivers, and the receivers then report the transmission results to the dispatcher of the master for summary.

In some embodiments of the present disclosure, the management component is in one server of a cluster, and the working components are in different servers of the cluster.

In some embodiments of the present disclosure, the servers of the cluster employ a JGroups communication protocol to transmit data.

JGroups is written in pure Java, and is a reliable message propagation tool kit. A communication cluster including multiple modes can be constructed easily by using JGroups. The nodes can communicate and coordinate with each other. By using JGroups, a user can set up a peer node network or a master-slave cluster mode.

The distributed cluster in the present application employs a master-slave mode. By using a discovery protocol of JGroups, it is only necessary to configure an IP+ port address of a master node at each node and then appoint a uniform cluster name. The master node is started first, and then slave nodes are started in sequence. As such, each slave node can discover the master node and automatically join in the cluster. If a slave node exits, the slave node that exits can be automatically detected by using a failure detection (FD) protocol of JGroups, and information of the node is removed from the whole cluster.

In an actual application, JGroups can provide two message propagation mechanisms, as follows.

The first message propagation mechanism can include direct transfer of a byte stream message. One node can send byte stream data to another node. In this mode, a sending end is generally required to serialize to-be-transmitted data into a byte array, and then the byte array is de-serialized into the data at a receiving end.

The second message propagation mechanism can include direct Remote Procedure Call (RPC) protocol calling of a class method. JGroups supports directly calling, at a node, a method in a certain class at another node remotely. The method can be the same as common method calling. This method can avoid serialization processing for a message, and can be more convenient.

Therefore, data transmission between the dispatcher and the receiver in the present disclosure is implemented by using the RPC function of JGroups.

Referring back to FIG. 2A, in step 240, a dispatcher of the management component generates synchronization tasks based on the metadata and dispatches the synchronization tasks to receivers of working components. The synchronization task is a type of data migration task. The synchronization task can also include identifier information of the first system, identity information of a user in the first system, file information of to-be-migrated data in the first system, identifier information of the second system, and identity information of the user in the second system. The to-be-migrated data can include metadata.

In some embodiments of the present disclosure, step 240 may include sub-steps 241-243.

In sub-step 241, a value of a data volume recorded in the metadata is extracted. As described above, the metadata can include a parameter about a value of a data volume. Therefore, the recorded value of the data volume can be directly extracted from the metadata.

In sub-step 242, if the data volume recorded in the metadata is less than a first threshold, the metadata is directly dispatched as the synchronization task to a receiver of a working component in the server where the management component is located. If the data volume recorded in the metadata is less than the first threshold, it can indicate that the metadata does not excessively increase the load of the server. Therefore, the metadata can be directly dispatched as the synchronization task to a receiver of a working component in the server where the management component is located. The first threshold can be set as required.

For example, if the data is less than 1 MB, the dispatcher directly dispatches the data to the receiver of the slave of the local server, because for small data, directly executing the data at the local server takes less time than dispatching the data through the network to other servers for execution.

In sub-step 243, if the data volume recorded in the metadata is not less than the first threshold, the metadata is dispatched as the synchronization task to a receiver of a working component in a server having a low load, such as a server having a minimum load. For data migration in the distributed mode, if the data volume recorded in the metadata is not less than the first threshold, the metadata can be dispatched as the synchronization task to a receiver of a working component in a server having a low load, such as a server having a minimum load, so that loads of the servers in the cluster are balanced, that is, the loads of the servers are not greatly different.

For example, if the data is greater than or equal to 1 MB, the dispatcher dispatches the data to receivers of slaves of other servers.

In some embodiments of the present disclosure, step 240 may include sub-steps 241-245.

In sub-step 241, a value of a data volume recorded in the metadata is extracted.

In sub-step 242, if the data volume recorded in the metadata is less than a first threshold, the metadata is directly dispatched as the synchronization task to a receiver of a working component in the server where the management component is located.

In sub-step 243, if the data volume recorded in the metadata is not less than the first threshold but less than a second threshold, a synchronization task is generated based on the metadata and the synchronization task is dispatched to a receiver of a working component in a server having a low load, such as a server having a minimum load.

In these embodiments of the present disclosure, in order to avoid low, or excessively low, efficiency in the process of transmitting large metadata, a second threshold can be additionally set. Similarly, the second threshold can be set as required, and the second threshold can be set greater than the first threshold.

When the data volume recorded in the metadata is not less than the first threshold but less than the second threshold, a synchronization task is generated based on the metadata and is dispatched to a receiver of a working component in a server having a low load, such as a server having a minimum load.

In sub-step 244, if the data volume recorded in the metadata is not less than the second threshold, an upper-layer interface for large file slicing is called. The upper-layer interface for large file slicing calls an underlying operation interface for large file slicing of the second system through the abstract interface class to slice a large file corresponding to the metadata. If the data volume recorded in the metadata is not less than the second threshold, it can indicate that the data volume of the metadata is large or excessively large. In order to ensure the data migration speed, a large file corresponding to the metadata can be sliced to divide the large file into several smaller slices. This is equivalent to dividing the metadata into a corresponding number of data slices. Specifically, an upper-layer interface for large file slicing can be called, and the upper-layer interface for large file slicing can call an underlying operation interface for large file slicing of the second system through the abstract interface class to slice the large file corresponding to the metadata.

The large file can be divided into several slices having an identical data volume, or can be randomly divided into several slices having data volumes that are not exactly the same. In some examples, it may be necessary to ensure that the data volume of each slice is less than the second threshold. If there is a slice whose data volume is not less than the second threshold, the slice is to be segmented again. The number of slices each time can be set as required.

In sub-step 245, a synchronization task is generated based on slice information of different slices of the metadata and is dispatched to receivers of working components of multiple servers having low loads. After the large file corresponding to the metadata is sliced, different synchronization tasks can be generated for slice information of different slices of the metadata, i.e., data included in different slices. Then, according to an ascending order of loads of the servers in the current cluster, the synchronization tasks are distributed to receivers of working components in servers, which correspond to the number of synchronization tasks, based on the ascending order of the loads. For example, if five synchronization tasks are generated, five servers having lowest loads are selected according to an ascending order of loads of the servers in the current cluster. Then, the five synchronization tasks are dispatched to receivers of working components of the five servers respectively, so that the receiver of the working component of each server receives one synchronization task, and synchronization tasks received by receivers of working components of any two servers are different synchronization tasks.

The five synchronization tasks can be dispatched to the receivers of the working components of the five servers randomly or according to a certain sequence. For example, according to a corresponding relationship between data volumes of the synchronization tasks in a descending order and loads of the servers in an ascending order, the five synchronization tasks are dispatched to the receivers of the working components of the five servers.

In step 250, the receivers of the working components execute an upper-layer interface for actual data acquisition according to the received synchronization tasks, and the upper-layer interface for actual data acquisition calls an underlying acquisition interface for actual data acquisition of the first system through the abstract class interface to acquire actual data of the migration task from the first system.

In these embodiments of the present disclosure, the synchronization task includes file information of to-be-migrated metadata in the first system, but the synchronization task does not include the to-be-migrated metadata, e.g., actual data that is to be migrated in the current synchronization task. The actual data that is to be migrated in the synchronization task is still stored in the first system. Therefore, the actual data that is to be migrated in the synchronization task is to be acquired from the first system. Specifically, after receiving the synchronization task, the receiver of the working component of the server that is responsible for executing the synchronization task can execute an upper-layer interface for actual data acquisition. Thus, the upper-layer interface for actual data acquisition can call an underlying acquisition interface for actual data acquisition of the first system through the abstract class interface to acquire the actual data of the migration task from the first system, that is, the actual data that is to be migrated in the synchronization task.

In step 260, synchronizers of the working components execute upper-layer interfaces for data synchronization, and the upper-layer interfaces for data synchronization call the underlying operation interfaces of the second system through the abstract interface class to synchronize the actual data to the second system.

After the actual data that is to be migrated in the synchronization task is acquired, the actual data can be synchronized to the second system. Specifically, synchronizers of the working components can execute upper-layer interfaces for data synchronization. The upper-layer interfaces for data synchronization can call the underlying operation interfaces of the second system through the abstract interface class to synchronize the actual data to the second system.

In some embodiments of the present disclosure, step 260 can include sub-step 261.

In sub-step 261, The synchronizers of the working components call, according to a speed limiting instruction, a thread corresponding to the speed limiting instruction to execute the upper-layer interfaces for data synchronization. The upper-layer interfaces for data synchronization call the underlying operation interfaces of the second system through the abstract interface class to synchronize the actual data to the second system.

In order to adjust a data transmission speed in the data migration process, in these embodiments of the present disclosure, a speed limiting instruction can be input. The instruction includes an acceptable data transmission speed in the data migration process, which can include a specific speed limit value or a speed range. As such, the synchronizers of the working components can call, according to the speed limiting instruction, a thread corresponding to the speed limiting instruction to execute the upper-layer interfaces for data synchronization. The upper-layer interfaces for data synchronization can call the underlying operation interfaces of the second system through the abstract interface class to synchronize the actual data to the second system according to the speed of the speed limit value or at a data transmission speed in the speed range. The thread corresponding to the speed limiting instruction can exist in the foregoing work thread pool, or can include an additionally created thread.

In these embodiments of the present disclosure, a migration task of migrating data in a first system to a second system can be received. The first system and the second system can include any two systems among multiple systems. Then, upper-layer interfaces corresponding to the migration task are called, and the upper-layer interfaces call underlying operation interfaces of the first system and the second system through an abstract interface class to migrate the data of the first system to the second system.

Bidirectional data transmission and migration can be implemented between any two data ends, including inter-bucket migration inside a data end. Secondly, the data migration technology of the present disclosure can have a good extension function, and can implement bidirectional data transmission and migration between any data terminal, including cloud storage products that may not have supported data migration yet such as Baidu Object Storage and Kingsoft Standard Storage Service, and any other data end.

In addition, the present disclosure can support distributed data transmission, which can improve the efficiency of data migration. For example, the first system and the second system are OSSs of two regions. Data is transmitted from a bucket in an OSS of one region to a bucket of another region. A common network path is used in a test method. Data is first downloaded from one bucket, and then uploaded through an intranet link to another bucket for storage. The transmission employs a distributed cluster environment, e.g., Elastic Compute Service (ECS) of ALIYUN in Hangzhou. In this environment, a single server is configured with a 4-core CPU, a memory of 4 G, and an intranet bandwidth of 500 Mbps, and there are 5 nodes in total. Test examples are shown in Table (1) below:

TABLE (1)

| Data size | Standalone | | Distributed mode (5 nodes) | |
| --- | --- | --- | --- | --- |
| | Time | Efficiency | Time | Efficiency |
| 10.5 G | 00:03:20 | 53 MB/s | 00:00:53 | 202 MB/s |
| 172 G | 01:01:46 | 47 MB/s | 00:12:37 | 232 MB/s |
| 995 G | no test | no test | 01:06:56 | 257 MB/s |

In Table (1), the unit in the efficiency columns is megabits per second (MB/s).

It can be seen that as the data scale increases, the efficiency advantage of the distributed transmission in the present disclosure can become more evident, which may be directly proportional to the node scale of the cluster.

It is noted that the foregoing method embodiments are expressed as a series of action combinations for ease of description. However, it can be understood that the embodiments of the present disclosure are not limited by the described action sequence, because some steps can be performed in other sequences or simultaneously according to the embodiments of the present disclosure. Secondly, it can be also understood that certain actions described herein may not be required to implement the embodiments of the present disclosure.

Figure 3:
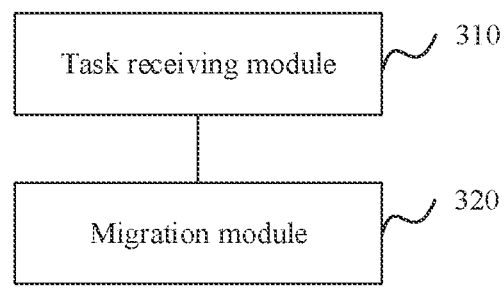
FIG. 3 is a block diagram of an exemplary data migration apparatus according to some embodiments of the present disclosure.

Referring to FIG. 3, FIG. 3 is a block diagram of an exemplary data migration apparatus according to some embodiments of the present disclosure. Specifically, the apparatus can include a task receiving module 310 and a migration module 320.

Task receiving module 310 can be adapted to receive a migration task of migrating data in a first system to a second system. The first system and the second system can include any two systems among multiple systems.

Migration module 320 can be adapted to call upper-layer interfaces corresponding to the migration task, and call, by using the upper-layer interfaces, underlying operation interfaces of the first system and the second system through an abstract interface class to migrate the data of the first system to the second system.

In some embodiments of the present disclosure, migration module 320 can includes an upper-layer interface determining sub-module, a data acquisition sub-module, and a data synchronization sub-module.

The upper-layer interface determining sub-module can be adapted to determine upper-layer interfaces belonging to data acquisition and upper-layer interfaces belonging to data synchronization.

The data acquisition sub-module can be adapted to call, for the upper-layer interfaces belonging to data acquisition, underlying operation interfaces of the first system through the abstract interface class to acquire data from the first system.

The data synchronization sub-module adapted to call, for the upper-layer interfaces belonging to data synchronization, underlying operation interfaces of the second system through the abstract interface class to synchronize the data acquired from the first system to the second system.

In some embodiments of the present disclosure, the data acquisition sub-module can includes a first underlying operation interface determining sub-module and a first underlying operation interface calling sub-module.

The first underlying operation interface determining sub-module can be adapted to, for a first upper-layer interface in the upper-layer interfaces belonging to data acquisition, directly call a first abstract class interface in the abstract interface class and corresponding to the first upper-layer interface as an underlying operation interface. The first upper-layer interface can include a universal interface for different systems.

The first underlying operation interface calling sub-module can be adapted to, for second upper-layer interfaces in the upper-layer interfaces belonging to data acquisition, generate a first interface class for the first system through the abstract interface class, and call, in the first interface class, underlying operation interfaces corresponding to the second upper-layer interfaces. The second upper-layer interfaces may include one or more interfaces not universal for different systems.

In some embodiments of the present disclosure, the data synchronization sub-module can includes a second underlying operation interface determining sub-module and a second underlying operation interface calling sub-module.

The second underlying operation interface determining sub-module can be adapted to, for a third upper-layer interface in the upper-layer interfaces belonging to data synchronization, directly call a second abstract class interface in the abstract interface class and corresponding to the third upper-layer interface as an underlying operation interface. The third upper-layer interface can include a universal interface for different systems.

The second underlying operation interface calling sub-module can be adapted to, for fourth upper-layer interfaces in the upper-layer interfaces belonging to data synchronization, generate a second interface class for the second system through the abstract interface class, and call, in the second interface class, underlying operation interfaces corresponding to the fourth upper-layer interfaces. The fourth upper-layer interfaces may include one or more interfaces not universal for different systems.

In some embodiments of the present disclosure, additional to migration module 320, the apparatus can further includes a migration determining module.

The migration determining module can be adapted to determine whether the data in the first system is successfully migrated to the second system. If it is determined that the migration fails, the module can execute the migration module again or repeatedly until the number of retries reaches a retry threshold or the migration succeeds in the retry threshold.

In some embodiments of the present disclosure, additional to migration module 320, the apparatus can further include a pause instruction determining module and a pause recording module.

The pause instruction determining module can be adapted to determine whether a pause instruction is received. If it is determined that the pause instruction is received, the apparatus directs the operation to a pause recording sub-module.

The pause recording module can be adapted to pause the migration of the data in the first system to the second system, and record a data location where the migration has proceeded in the first system at a pause moment.

Further, additional to the pause instruction judgment module, the apparatus can further include a restart instruction determining module.

The restart instruction determining module can be adapted to determine whether a restart instruction is received. If it is determined that the restart instruction is received, the apparatus redirects the operation to the migration module starting from the data location where the migration has proceeded in the first system at the pause moment.

In some embodiments of the present disclosure, when the first system is a client terminal file system, additional to task receiving module 310, the apparatus can further include an application program installation module 300.

Application program installation module 300 can be adapted to install an application program in a client terminal. The application program simulates underlying operation interfaces for a specified file.

In some embodiments of the present disclosure, additional to migration module 320, the apparatus can further include a data monitoring module and a change data synchronization module.

The data monitoring module can be adapted to monitor whether the client terminal file system is changed with respect to data migrated to the second system most recently. If a change occurs, the apparatus directs the operation to a change data synchronization module.

The change data synchronization module can be adapted to call the upper-layer interfaces corresponding to the migration task, and call, by using the upper-layer interfaces, the underlying operation interfaces of the first system and the second system through the abstract interface class to synchronize change data of the client terminal file system to the second system.

In some embodiments of the present disclosure, additional to the data acquisition sub-module, the apparatus can further include a signature sub-module.

The signature sub-module can be adapted to call an upper-layer interface for signature, and call, by using the upper-layer interface for signature, an underlying operation interface for signature of the first system to sign the data.

Further, additional to the data synchronization sub-module, the apparatus can further include a signature verification sub-module.

The signature verification sub-module can be adapted to call an upper-layer interface for signature authentication, and call, by using the upper-layer interface for signature authentication, an underlying operation interface for signature authentication of the second system to perform signature verification on the data.

In some embodiments of the present disclosure, additional to migration module 320, the apparatus can further include a first file list acquisition module, a second file list acquisition module, and a difference prompting module.

The first file list acquisition module can be adapted to call an upper-layer interface of a file list for the first system, and call, by using the upper-layer interface for calling a file list, an underlying operation interface of the first system through the abstract interface class to acquire a file list of the first system.

The second file list acquisition module can be adapted to call an upper-layer interface of a file list for the second system, and call, by using the upper-layer interface for calling a file list, an underlying operation interface of the second system through the abstract interface class to acquire a file list of the second system.

The difference prompting module can be adapted to compare the file list of the first system and the file list of the second system, and prompt a difference between the two file lists to a client terminal.

In some embodiments of the present disclosure, additional to the upper-layer interface determining sub-module, the apparatus can further include a first identity verification module and a second identity verification module.

The first identity verification module can be adapted to call an upper-layer interface for identity verification for the first system, and call, by using the upper-layer interface for identity verification, an underlying operation interface of the first system through the abstract interface class to verify the identity information of the user in the first system.

The second identity verification module can be adapted to call an upper-layer interface for identity verification for the second system, and call, by using the upper-layer interface for identity verification, an underlying operation interface of the second system through the abstract interface class to verify the identity information of the user in the second system.

In these embodiments of the present disclosure, a migration task of migrating data in a first system to a second system can be received. The first system and the second system can be any two systems among multiple systems. Then, upper-layer interfaces corresponding to the migration task are called, and the upper-layer interfaces call underlying operation interfaces of the first system and the second system through an abstract interface class to migrate the data of the first system to the second system.

First of all, bidirectional data transmission and migration can be implemented between any two data ends, including inter-bucket migration inside a data end.

Secondly, the data migration technology of the present disclosure can have a good extension function, and can implement bidirectional data transmission and migration between any data terminal, including cloud storage products that may not have supported data migration yet such as Baidu Object Storage and Kingsoft Standard Storage Service, and any other data end.

Figure 4:
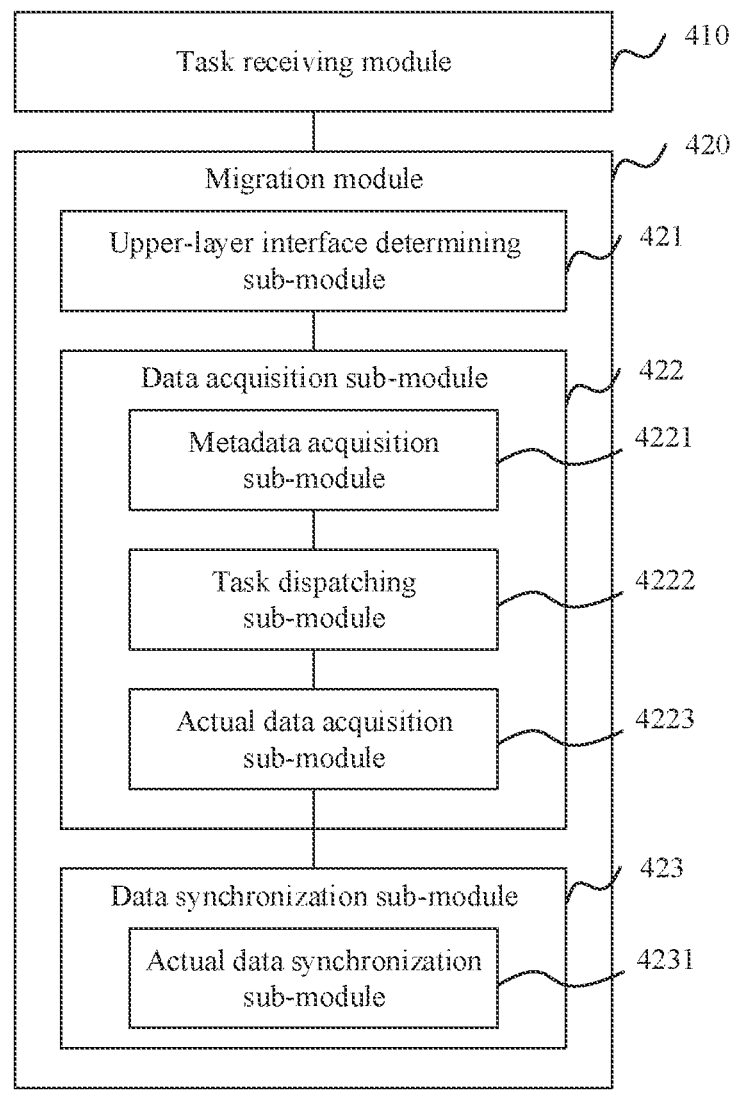
FIG. 4 is a block diagram of an exemplary data migration apparatus according to some embodiments of the present disclosure.

Referring to FIG. 4, FIG. 4 is a block diagram of an exemplary data migration apparatus according to some embodiments of the present disclosure. Specifically, the apparatus can include a task receiving module 410 and a migration module 420.

Task receiving module 410 can be adapted to receive a migration task of migrating data in a first system to a second system. The first system and the second system can include any two systems among multiple systems.

Migration module 420 can be adapted to call upper-layer interfaces corresponding to the migration task, and call, by using the upper-layer interfaces, underlying operation interfaces of the first system and the second system through an abstract interface class to migrate the data of the first system to the second system. The migration module 420 can include an upper-layer interface determining sub-module 421, a data acquisition sub-module 422, and a data synchronization sub-module 423.

Upper-layer interface determining sub-module 421 can be adapted to determine upper-layer interfaces belonging to data acquisition and upper-layer interfaces belonging to data synchronization.

Data acquisition sub-module 422 can be adapted to call, for the upper-layer interfaces belonging to data acquisition, underlying operation interfaces of the first system through the abstract interface class to acquire data from the first system. Data acquisition sub-module 422 can include a metadata acquisition sub-module 4221, a task dispatching sub-module 4222, and an actual data acquisition sub-module 4223.

Metadata acquisition sub-module 4221 can be adapted to execute, by using a scanner of a management component, an upper-layer interface for metadata acquisition. The upper-layer interface for metadata acquisition calls an underlying operation interface for metadata acquisition of the first system through an abstract class interface to acquire metadata corresponding to the migration task from the first system.

Task dispatching sub-module 4222 can be adapted to generate, by using a dispatcher of the management component, synchronization tasks based on the metadata, and dispatch the synchronization tasks to receivers of working components.

In some embodiments of the present disclosure, task dispatching sub-module 4222 can include a data volume value extraction sub-module, a first metadata dispatching sub-module, and a second metadata dispatching sub-module.

The data volume value extraction sub-module can be adapted to extract a value of a data volume recorded in the metadata.

The first metadata dispatching sub-module can be adapted to, if the data volume recorded in the metadata is less than a first threshold, directly dispatch the metadata as the synchronization task to a receiver of a working component in the server where the management component is located.

The second metadata dispatching sub-module can be adapted to, if the data volume recorded in the metadata is not less than the first threshold, dispatch the metadata as the synchronization task to a receiver of a working component in a server having a low load, such as a server having a minimum load.

In some embodiments of the present disclosure, task dispatching sub-module 4222 can include a data volume value extraction sub-module, a first metadata dispatching sub-module, a third metadata dispatching sub-module, and a metadata slicing sub-module.

The data volume value extraction sub-module can be adapted to extract a value of a data volume recorded in the metadata.

The first metadata dispatching sub-module can be adapted to, if the data volume recorded in the metadata is less than a first threshold, directly dispatch the metadata as the synchronization task to a receiver of a working component in the server where the management component is located.

The third metadata dispatching sub-module can be adapted to, if the data volume recorded in the metadata is not less than the first threshold but less than a second threshold, generate a synchronization task based on the metadata and dispatch the synchronization task to a receiver of a working component in a server having a low load, such as a server having a minimum load.

The metadata slicing sub-module can be adapted to, if the data volume recorded in the metadata is not less than the second threshold, call an upper-layer interface for large file slicing. The upper-layer interface for large file slicing calls an underlying operation interface for large file slicing of the second system through the abstract interface class to slice a large file corresponding to the metadata.

Task dispatching sub-module 4222 can be adapted to generate synchronization tasks based on slice information of different slices of the metadata, and dispatch the synchronization tasks to receivers of working components of multiple servers having low loads.

Actual data acquisition sub-module 4223 can be adapted to execute, by using the receivers of the working components, an upper-layer interface for actual data acquisition according to the received synchronization tasks. The upper-layer interface for actual data acquisition calls an underlying acquisition interface for actual data acquisition of the first system through the abstract class interface to acquire actual data of the migration task from the first system.

Data synchronization sub-module 423 can be adapted to call, for the upper-layer interfaces belonging to data synchronization, underlying operation interfaces of the second system through the abstract interface class to synchronize the data acquired from the first system to the second system. Data synchronization sub-module 423 can include an actual data synchronization sub-module 4231.

Actual data synchronization sub-module 4231 can be adapted to execute, by using synchronizers of the working components, upper-layer interfaces for data synchronization. The upper-layer interfaces for data synchronization call the underlying operation interfaces of the second system through the abstract interface class to synchronize the actual data to the second system.

In some embodiments of the present disclosure, actual data synchronization sub-module 4231 can include a first actual data synchronization sub-module.

The first actual data synchronization sub-module can be adapted to call, by using the synchronizers of the working components according to a speed limiting instruction, a thread corresponding to the speed limiting instruction to execute the upper-layer interfaces for data synchronization. The upper-layer interfaces for data synchronization call the underlying operation interfaces of the second system through the abstract interface class to synchronize the actual data to the second system.

In these embodiments of the present disclosure, a migration task of migrating data in a first system to a second system can be received. The first system and the second system can include any two systems among multiple systems. Then, upper-layer interfaces corresponding to the migration task are called, and the upper-layer interfaces call underlying operation interfaces of the first system and the second system through an abstract interface class to migrate the data of the first system to the second system.

Thus, bidirectional data transmission and migration can be implemented between any two data ends, including inter-bucket migration inside a data end. Secondly, the data migration technology of the present disclosure can have a good extension function, and can implement bidirectional data transmission and migration between any data terminal, including cloud storage products that may not have supported data migration yet such as Baidu Object Storage and Kingsoft Standard Storage Service, and any other data end.

In addition, the present disclosure also supports stand-alone data transmission and distributed data transmission, which can improve the efficiency of data migration.

The apparatus embodiments can have functions that are basically similar to the functions of the method embodiments. For related parts, reference can be made to the descriptions in the method embodiments.

The embodiments in the disclosure are described progressively, each embodiment emphasizes a part different from other embodiments, and identical or similar parts of the embodiments can be obtained with reference to each other.

It can be understood that the embodiments of the present disclosure can be provided as a method, an apparatus, or a computer program product. Therefore, the embodiments of present disclosure may be implemented as a complete hardware embodiment, a complete software embodiment, or an embodiment combining software and hardware. Moreover, the embodiments of the present disclosure can be in the form of a computer program product implemented on one or more computer usable synchronization media (including, but not limited to, a magnetic disk synchronizer, a CD-ROM, an optical synchronizer and the like) including computer usable program codes.

In some configurations, the computer device includes one or more central processing units (CPUs), an input/output interface, a network interface, and a memory. The memory can include computer readable media such as a volatile synchronizer, a random access synchronizer (RAM), and/or non-volatile memory, e.g., a read-only synchronizer (ROM) or a flash RAM. The memory is an example of a computer readable medium. The computer readable medium includes non-volatile and volatile media as well as movable and non-movable media, and can implement information synchronization by means of any method or technology. The information can be a computer readable instruction, a data structure, and a module of a program or other data. An example of the synchronization medium of a computer includes, but is not limited to, a phase change memory (PRAM), a static random access synchronizer (SRAM), a dynamic random access synchronizer (DRAM), other types of RAMs, a ROM, an electrically erasable programmable read-only synchronizer (EEPROM), a flash memory or other memory technologies, a compact disk read-only synchronizer (CD-ROM), a digital versatile disc (DVD) or other optical synchronization, a cassette tape, a magnetic tape/magnetic disk synchronization or other magnetic synchronization devices, or any other non-transmission medium. The synchronization medium can be used to synchronize information accessible to the computing device. According to the definition in this text, the computer readable medium does not include transitory media, such as a modulated data signal and a carrier.

The embodiments of the present disclosure are described with reference to flowcharts and/or block diagrams of the method, terminal device (system) and computer program product according to the embodiments of the present disclosure. It is understood that a computer program instruction can be used to implement each process and/or block in the flowcharts and/or block diagrams and combinations of processes and/or blocks in the flowcharts and/or block diagrams. These computer program instructions can be provided to a computer, an embedded processor, or a processor of another programmable data processing terminal device to generate a server, so that the instructions executed by a computer or a processor of another programmable data processing terminal device generate an apparatus for implementing a specified function in one or more processes in the flowcharts and/or in one or more blocks in the block diagrams.

These computer program instructions can also be synchronized in a computer readable synchronizer that can instruct a computer or another programmable data processing terminal device to work in a particular manner, such that the instructions synchronized in the computer readable synchronizer generate an article of manufacture that includes an instruction apparatus. The instruction apparatus implements a function specified in one or more processes in the flowcharts and/or in one or more blocks in the block diagrams.

These computer program instructions can also be loaded onto a computer or another programmable data processing terminal device, such that a series of operation steps are performed on the computer or another programmable terminal device, thus generating computer-implemented processing. Therefore, the instructions executed on the computer or another programmable terminal device provide steps for implementing a function specified in one or more processes in the flowcharts and/or in one or more blocks in the block diagrams.

Although some embodiments of the present disclosure have been described, those skilled in the art can make additional changes and modifications to these embodiments according to the basic inventive concept disclosed herein. Therefore, the appended claims are intended to be illustrated as including the embodiments and all changes and modifications falling in the scope of the embodiments of the present disclosure.

Finally, is further noted that, in this text, the relational terms such as "first" and "second" are merely used to distinguish one entity or operation from another entity or operation, but do not necessarily require or imply any such actual relationship or sequence between these entities or operations. Moreover, the terms "include," "comprise" or their other variations are intended to cover non-exclusive inclusion, so that a process, a method, an object or a terminal device including a series of elements not only includes the elements, but also includes other elements not clearly listed, or further includes inherent elements of the process, method, object or terminal device. In the absence of more limitations, an element defined by "including a/an . . . " does not exclude that the process, method, object or terminal device including the element further has other identical elements.

A data migration method and a data migration apparatus provided in the present disclosure are described above. Specific examples are used in this text to illustrate the principle and implementations of the present disclosure. The foregoing description of the embodiments is merely used to help understand the method of the present disclosure and its core idea. Meanwhile, those of ordinary skill in the art can make changes to the specific implementations and application scope according to the idea of the present disclosure. In conclusion, the content of the disclosure should not be construed as a limitation to the present disclosure.

The invention claimed is:

1. A method of migrating data between a first system and a second system, comprising:
   receiving a migration task of migrating data from the first system to the second system;
   determining whether upper-layer interfaces of an upper-layer interface layer corresponding to the migration task belong to data acquisition or data synchronization;
   calling, for the upper-layer interfaces belonging to data acquisition, underlying operation interfaces of the first system through an abstract interface class layer to acquire data from the first system; and
   calling, for the upper-layer interfaces belonging to data synchronization, the underlying operation interfaces of the second system through the abstract interface class layer to synchronize the data acquired from the first system to the second system.

2. The method according to claim 1, further comprising:
   calling the upper-layer interfaces of the upper-layer interface layer corresponding to the migration task; and
   calling, through an abstract interface class layer, underlying operation interfaces of the first system and the second system corresponding to the upper-layer interfaces, to migrate the data from the first system to the second system, wherein the abstract interface class layer inherits the upper-layer interface layer, and the underlying operation interfaces inherit the abstract interface class layer.

3. The method according to claim 2, further comprising:
   executing, by a scanner of a management component, an upper-layer interface for metadata acquisition; and
   calling, by the upper-layer interface for metadata acquisition, an underlying operation interface for metadata acquisition of the first system through an abstract class interface to acquire metadata corresponding to the migration task from the first system.

4. The method according to claim 3, further comprising:
   generating, by a dispatcher of the management component, synchronization tasks based on the metadata; and
   dispatching the synchronization tasks to receivers of working components.

5. The method according to claim 4, further comprising:
   extracting a value of a data volume recorded in the metadata;
   in response to the data volume recorded in the metadata being less than a first threshold, dispatching the metadata as the synchronization task to a receiver of a working component in a server of a cluster where the management component is located; or
   in response to the data volume recorded in the metadata being not less than the first threshold, dispatching the metadata as the synchronization task to a receiver of a working component in a different server of the cluster.

6. The method according to claim 4, further comprising:
   extracting a value of a data volume recorded in the metadata;
   in response to the data volume recorded in the metadata being less than a first threshold, dispatching the metadata as the synchronization task to a receiver of a working component in a server of a cluster where the management component is located; or in response to the data volume recorded in the metadata being not less than the first threshold but less than a second threshold, generating a synchronization task based on the metadata and dispatching the synchronization task to a receiver of a working component in a different server of the cluster; or
   in response to the data volume recorded in the metadata being not less than the second threshold, calling an upper-layer interface for file slicing, wherein the upper-layer interface for file slicing calls an underlying operation interface for file slicing of the second system through the abstract interface class layer to slice a file corresponding to the metadata;
   generating synchronization tasks based on slice information of different slices of the metadata; and
   dispatching the synchronization tasks to receivers of working components of multiple servers of the cluster.

7. The method according to claim 4, wherein the receivers of the working components execute an upper-layer interface for data acquisition according to the received synchronization tasks, and the upper-layer interface for data acquisition calls an underlying acquisition interface for data acquisition of the first system through the abstract class interface to acquire data of the migration task from the first system.

8. The method according to claim 7, wherein synchronizers of the working components execute upper-layer interfaces for data synchronization, and the upper-layer interfaces for data synchronization call the underlying operation interfaces of the second system through the abstract interface class layer to synchronize the data to the second system.

9. The method according to claim 1, wherein the first system is a client terminal file system, and wherein, before receiving the migration task, the method further comprises:
   installing an application program in a client terminal, wherein the application program simulates the underlying operation interfaces for a specified file.

10. The method according to claim 2, after calling the upper-layer interfaces corresponding to the migration task and calling the underlying operation interfaces of the first system and the second system, further comprising:
    calling an upper-layer interface of a file list for the first system, and calling, by the upper-layer interface for calling a file list, an underlying operation interface of the first system through the abstract interface class layer to acquire a file list of the first system;
    calling an upper-layer interface of a file list for the second system, and calling, by the upper-layer interface for calling a file list, an underlying operation interface of the second system through the abstract interface class layer to acquire a file list of the second system; and
    comparing the file list of the first system and the file list of the second system, and prompting a result of the comparison between the two file lists to a client terminal.

11. An apparatus for migrating data between a first system and a second system, comprising:
    a memory storing a set of instructions; and
    a processor configured to execute the set of instructions to cause the task scheduling apparatus to perform operations comprising:
    receiving a migration task of migrating data from the first system to the second system;
    determining whether upper-layer interfaces of an upper-layer interface layer corresponding to the migration task belong to data acquisition or data synchronization;
    calling, for the upper-layer interfaces belonging to data acquisition, underlying operation interfaces of the first system through an abstract interface class layer to acquire data from the first system; and
    calling, for the upper-layer interfaces belonging to data synchronization, the underlying operation interfaces of the second system through the abstract interface class layer to synchronize the data acquired from the first system to the second system.

12. The apparatus according to claim 11, wherein the at least one processor is configured to execute the set of instructions to cause the apparatus to further perform:
calling the upper-layer interfaces of the upper-layer interface layer corresponding to the migration task; and
calling, through an abstract interface class layer, underlying operation interfaces of the first system and the second system corresponding to the upper-layer interfaces, to migrate the data from the first system to the second system, wherein the abstract interface class layer inherits the upper-layer interface layer, and the underlying operation interfaces inherit the abstract interface class layer.

13. The apparatus according to claim 12, wherein the at least one processor is configured to execute the set of instructions to cause the apparatus to further perform:
executing, by a scanner of a management component, an upper-layer interface for metadata acquisition; and
calling, by the upper-layer interface for metadata acquisition, an underlying operation interface for metadata acquisition of the first system through an abstract class interface to acquire metadata corresponding to the migration task from the first system.

14. The apparatus according to claim 13, wherein the at least one processor is configured to execute the set of instructions to cause the apparatus to further perform:
generating, by a dispatcher of the management component, synchronization tasks based on the metadata; and
dispatching the synchronization tasks to receivers of working components.

15. The apparatus according to claim 14, wherein the at least one processor is configured to execute the set of instructions to cause the apparatus to further perform:
extracting a value of a data volume recorded in the metadata;
in response to the data volume recorded in the metadata being less than a first threshold, dispatching the metadata as the synchronization task to a receiver of a working component in a server of a cluster where the management component is located; and
in response to the data volume recorded in the metadata being not less than the first threshold, dispatching the metadata as the synchronization task to a receiver of a working component in a different server of the cluster.

16. The apparatus according to claim 14, wherein the at least one processor is configured to execute the set of instructions to cause the apparatus to further perform:
extracting a value of a data volume recorded in the metadata;
in response to the data volume recorded in the metadata being less than a first threshold, dispatching the metadata as the synchronization task to a receiver of a working component in a server of a cluster where the management component is located; and
in response to the data volume recorded in the metadata being not less than the first threshold but less than a second threshold, generating a synchronization task based on the metadata and dispatching the synchronization task to a receiver of a working component in a different server of the cluster;
in response to the data volume recorded in the metadata being not less than the second threshold, calling an upper-layer interface for file slicing, wherein the upper-layer interface for file slicing calls an underlying operation interface for file slicing of the second system through the abstract interface class layer to slice a file corresponding to the metadata;
generating synchronization tasks based on slice information of different slices of the metadata; and
dispatching the synchronization tasks to receivers of working components of multiple servers of the cluster.

17. A non-transitory computer-readable storage medium storing a set of instructions that is executable by one or more processors of one or more electronic devices to cause the one or more electronic devices to perform a method of migrating data between a first system and a second system, the method comprising:
receiving a migration task of migrating data from the first system to the second system;
determining whether upper-layer interfaces of an upper-layer interface layer corresponding to the migration task belong to data acquisition or data synchronization;
calling, for the upper-layer interfaces belonging to data acquisition, underlying operation interfaces of the first system through an abstract interface class layer to acquire data from the first system; and
calling, for the upper-layer interfaces belonging to data synchronization, the underlying operation interfaces of the second system through the abstract interface class layer to synchronize the data acquired from the first system to the second system.

18. The non-transitory computer-readable storage medium according to claim 17, wherein the method further comprises:
calling the upper-layer interfaces of the upper-layer interface layer corresponding to the migration task; and
calling, through an abstract interface class layer, underlying operation interfaces of the first system and the second system corresponding to the upper-layer interfaces, to migrate the data from the first system to the second system, wherein the abstract interface class layer inherits the upper-layer interface layer, and the underlying operation interfaces inherit the abstract interface class layer.

19. The non-transitory computer-readable storage medium according to claim 18, wherein the method further comprises:
executing, by a scanner of a management component, an upper-layer interface for metadata acquisition;
calling, by the upper-layer interface for metadata acquisition, an underlying operation interface for metadata acquisition of the first system through an abstract class interface to acquire metadata corresponding to the migration task from the first system;
generating, by a dispatcher of the management component, synchronization tasks based on the metadata; and
dispatching the synchronization tasks to receivers of working components.

20. The non-transitory computer-readable storage medium according to claim 19, wherein the method further comprises:
extracting a value of a data volume recorded in the metadata;
in response to the data volume recorded in the metadata being less than a first threshold, dispatching the metadata as the synchronization task to a receiver of a working component in a server of a cluster where the management component is located; and
in response to the data volume recorded in the metadata being not less than the first threshold, dispatching the metadata as the synchronization task to a receiver of a working component in a different server of the cluster.

21. The non-transitory computer-readable storage medium according to claim 19, wherein the method further comprises:
- extracting a value of a data volume recorded in the metadata;
- in response to the data volume recorded in the metadata being less than a first threshold, dispatching the metadata as the synchronization task to a receiver of a working component in a server of a cluster where the management component is located; and
- in response to the data volume recorded in the metadata being not less than the first threshold but less than a second threshold, generating a synchronization task based on the metadata and dispatching the synchronization task to a receiver of a working component in a different server of the cluster;
- in response to the data volume recorded in the metadata being not less than the second threshold, calling an upper-layer interface for file slicing, wherein the upper-layer interface for file slicing calls an underlying operation interface for file slicing of the second system through the abstract interface class layer to slice a file corresponding to the metadata;
- generating synchronization tasks based on slice information of different slices of the metadata; and
- dispatching the synchronization tasks to receivers of working components of multiple servers of the cluster.

* * * * *